United States Patent
Solon

(10) Patent No.: US 6,713,153 B2
(45) Date of Patent: Mar. 30, 2004

(54) ENVIRONMENTALLY SAFE APPARATUS FOR STORAGE OF DISCARDED TIRE RUBBER

(75) Inventor: Joseph J. Solon, Auburn, NY (US)

(73) Assignee: Interstate Recycling Corp., Auburn, NY (US)

(*) Notice: Subject to any disclaimer, the term of this patent is extended or adjusted under 35 U.S.C. 154(b) by 0 days.

(21) Appl. No.: 10/337,794

(22) Filed: Jan. 8, 2003

(65) Prior Publication Data

US 2003/0118775 A1 Jun. 26, 2003

Related U.S. Application Data

(62) Division of application No. 09/849,315, filed on May 7, 2001.

(51) Int. Cl.[7] .................................................. B32B 3/10
(52) U.S. Cl. ..................................... 428/124; 428/903.3
(58) Field of Search ........................... 428/124, 126, 428/903.3; 52/DIG. 9

(56) References Cited

U.S. PATENT DOCUMENTS

| | | | | | |
|---|---|---|---|---|---|
| 5,236,756 A | * | 8/1993 | Halliburton | ................... | 428/65 |
| 5,321,931 A | * | 6/1994 | Bluteau | ....................... | 53/435 |
| 5,340,630 A | * | 8/1994 | Tripp | .......................... | 428/54 |
| 5,472,750 A | * | 12/1995 | Miller | ........................... | 428/2 |
| 5,588,538 A | * | 12/1996 | Rundle | ........................ | 211/23 |
| 5,834,083 A | * | 11/1998 | Pignataro, Jr. | ............... | 428/61 |

* cited by examiner

*Primary Examiner*—Alexander S. Thomas

(57) ABSTRACT

Flat strips cut from discarded tires are stacked and stored as bulk rubber on pallets for easy handling, transport by fork lift trucks and storage in outside compacted storage space without accumulating water where mosquitos can breed. Typically flat rectangular longitudinal tread strips are folded and stacked in a plurality of abutting stacks about five feet high for rubber-to-rubber engagement in configurations extending substantially to opposite edges of a pallet platform, thus storing about a ton of bulk rubber per pallet. The pallets then may be transported and stored in compact stacks at outside locations without accumulating water and breeding mosquitos.

6 Claims, 4 Drawing Sheets

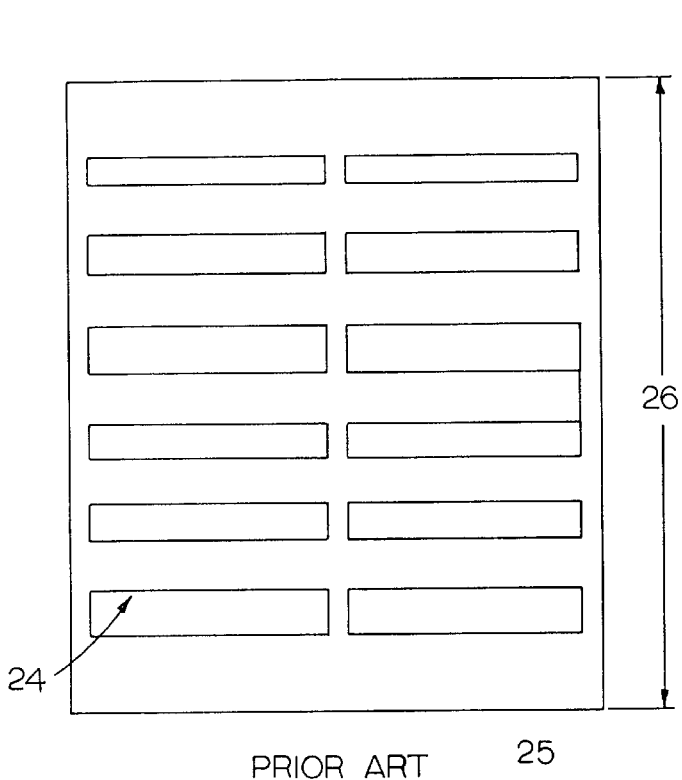
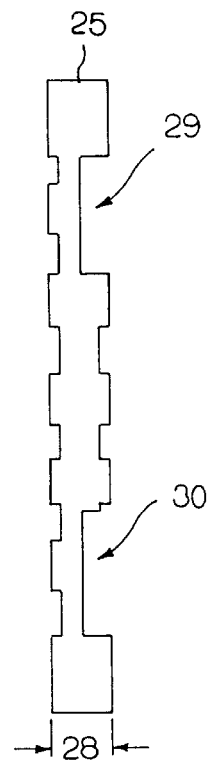
PRIOR ART
FIG. 2A
FIG. 2C
FIG. 2B
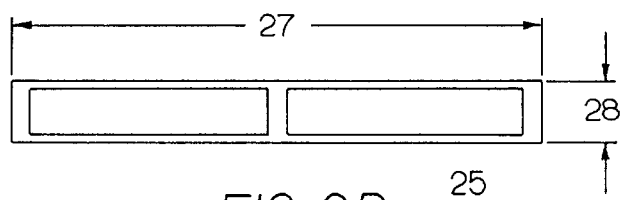
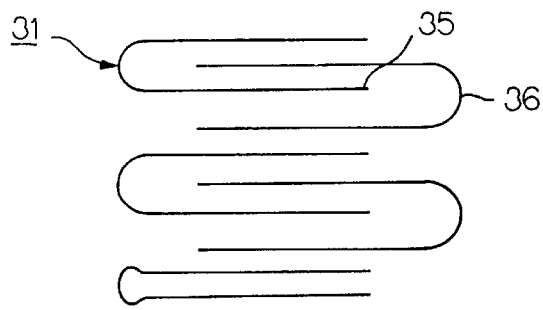
FIG. 4

ENVIRONMENTALLY SAFE APPARATUS FOR STORAGE OF DISCARDED TIRE RUBBER

This is a divisional application of my co-pending application Ser. No. 09/849,315 filed May 7, 2001 pending.

FIELD OF THE INVENTION

This invention relates to low cost methods and apparatus for environmentally safe storage of discarded tires, and more particularly it relates to the stacking and storage in outdoor resident sites of flat rubber sections cut from discarded tires on transportable pallets in a configuration which does not accumulate water.

BACKGROUND ART

The disposal of discarded tires has been a problem in the past and is currently even more of a problem because of the proliferation of automobiles and the current custom of storing discarded tire carcasses in outdoor dumps where the hollow carcasses accumulate water and provide breeding sites for mosquitos. In the heavily populated Northeast United States the number of discarded tire carcasses is now significantly increasing at the same time that mosquito carried diseases have resulted in an encephalitis epidemic.

Thus, there have been significant problems with this conventional storage method without adequate remedy to the problem of accumulation of water in the carcasses that will substantially eradicate this significant environmental pollution hazard. It is undisputed that the accumulation of rainwater within tire carcasses provides an ideal environment for breeding mosquitos. Any solution to this problem requires a low cost compact bulk storage procedure of tire carcass rubber, in outside dumping sites in a format readily reclaimed at low cost for later use in rubber products. No such prior art storage-reclaiming process is now known.

There have been attempts to reclaim rubber tire treads cut from the discarded carcasses in a format for making specific rubber products in the prior art, but this has not resolved the problem of low cost interim bulk storage of tire carcasses at outdoor sites in a configuration that precludes accumulation of water.

Furthermore, known prior art methods of processing tire carcasses as raw rubber material for various products have been directed toward specific product configurations that can absorb the high processing costs for accumulating and storing tire carcass inventories in indoor and factory warehousing sites required to resolve the environmental hazard of accumulation of water to avoid taking carcasses from the conventional unprocessed bulk storage in outdoor sites, and have not considered a preliminary processing of tire carcasses for producing an interim safe bulk outdoor storage of tires in an environmentally safe condition that precludes the accumulation of water and associated breeding of mosquitos.

Thus the prior art resolution of the environmental problems would require accumulation of processed tire carcasses for bulk storage at covered warehouse sites, a procedure that would be economically unfeasible. Furthermore any prior art attempting to deform tire carcasses for storage as a raw material from which to process rubber products required an accumulation and compression of tire carcass rubber for storage in expensive containers requiring bolts, clamps and cages along with the accompanying container construction labor and accessory costs.

Thus an effective economical way to eliminate the accumulation of water in tire carcass raw rubber inventories stored in outside dumping sites is a significant problem.

The compact storage and stacking of discarded tire carcasses in the prior art has been given some attention, for example in U.S. Pat. No. 5,321,931 issued on Jun. 21, 1994 to Yves J. Bluteau for METHOD AND APPARATUS FOR STORING USED TIRES; and U.S. Pat. No. 5,588,538 issued on Dec. 31, 1996 to Christopher Rundle, et al. for TIRE STACKING METHOD AND APPARATUS. These methods required costly accessory crates with internal posts for holding individual stacks of annular tire carcasses and gave no attention to the requirement for preventing accumulation of water in the stored tire carcasses.

Thus such prior art is not economically feasible for storage of discarded tire carcasses because of complex steps in cutting tires in half and compression of stacks of the annular tire carcasses into compact storable hatches in a manner requiring expensive jigs, bolts and clamps for compression and storage of the specially processed annular shaped tire carcass pieces in a desired compact storage condition.

Other background art has addressed the treatment of tire carcasses explicitly to provide a specific commercial product line, typically as set forth in U.S. Pat. No. 5,340,630, issued Aug. 23, 1994 to Benjamin A. Tripp for TWO PLY MATERIAL MADE FROM USED TIRES, and U.S. Pat. No. 5,834,083, issued to Alfred J. Pignataro, Jr. on Nov. 10, 1998 for USED TIRE RECYCLING INCLUDING SORTING TIRES, SHREDDING SIDEWALLS, STACKING TREAD STRIPS, AND UNIFORMLY DIMENSIONING AND BONDING THE TREAD STRIPS TOGETHER. Wherein tread strips are connected end to end to form longer belts with fastening devices holding the strips end-to-end.

These patents are not directed to the problems of outside bulk storage of tire carcasses in a format reducing environmental pollution and indeed consider the bulk storage of tire carcasses that accumulate water in outside dumps to be an acceptable practice.

U.S. Pat. No. 5,236,756, Aug. 17, 1993 by D. B. Halliburton for DRAINAGE CULVERTS MADE OF SIDEWALLS FROM DISCARDED TIRES compresses and stores stacks of sidewalls cut from tire carcasses in a rack having two steel end plates and a surrounding ring of steel rods threaded through a set of holes drilled through the sidewalls. Such a rack and method are cumbersome and expensive and therefore are not economically viable for outside bulk storage in dumping sites.

DISCLOSURE OF THE INVENTION

Accordingly this invention improves the prior art by providing inexpensive and effective environmentally safe methods and apparatus for outdoor storage of processed tire carcasses in a bulk configuration that precludes accumulation of water. The carcasses are processed by cutting discarded tire carcasses into sets of substantially flat storable sections for stacking on pallet platforms for compact outside bulk storage in a plurality of stacks that substantially cover the pallet platforms. The storable sections are stacked in rubber-to-rubber interfacing configurations producing frictional resistance against lateral movement of stacked sections on the pallet platform area thereby to stably withstand transportation of the pallets by fork lift truck to and from an outside bulk storage site. By covering substantially all of the loading platform areas with the storable sections stacked in the order of five feet high, substantially a ton of bulk rubber may be stored on each pallet. These loaded pallets are then moved to or reclaimed from an outdoor storage site with a fork lift truck, where the loaded pallets are stacked into a compact configuration.

When flat rectangular tread strips of specified width are cut from a carcass of a length greater than the length or width dimensions of a pallet storage platform, they may be folded into a length footprint configuration that does not accumulate water extending substantially between opposite pallet platform edges over a selected one of the length or width platform dimensions with a plurality of stacks abutted to substantially cover the loading platform areas edge to edge in the other platform dimension.

Flat treaded tire strips cut from the tire carcasses are dimensioned for stacking upon pallet load bearing platforms in a frictionally gripping inter-woven rubber-facing-rubber pattern that resists lateral movement during transport by fork lift trucks. Thus discarded tires are stored in a form for reclaiming the residual rubber when required for manufacturing or processing of a wide range of rubber containing products.

The methods and corresponding apparatus afforded by this invention are discussed in more detail throughout the following description, claims and the appended drawings.

BRIEF DESCRIPTION OF THE DRAWINGS

In the accompanying drawings, wherein like reference characters represent related features throughout the various views:

FIGS. 2A, 2B and 2C are respectively plan view, end view and side view of a conventional pallet adapted to be transported by a fork lift truck, which is employed in the present invention, FIGS. 3A and 3B respectively diagrammatically represent the method of stacking treaded tire carcass strips on a pallet platform in a preferred treaded strip loading pattern for one embodiment of the invention, FIG. 4 represents a diagrammatic foreshortened end view of a stack of treaded carcass strips interlocked in a preferred loading pattern embodiment afforded by FIGS. 3A and 3B.

THE PREFERRED EMBODIMENTS

Now the preferred embodiments of the invention are addressed with reference to the accompanying drawings.

Figure 1:
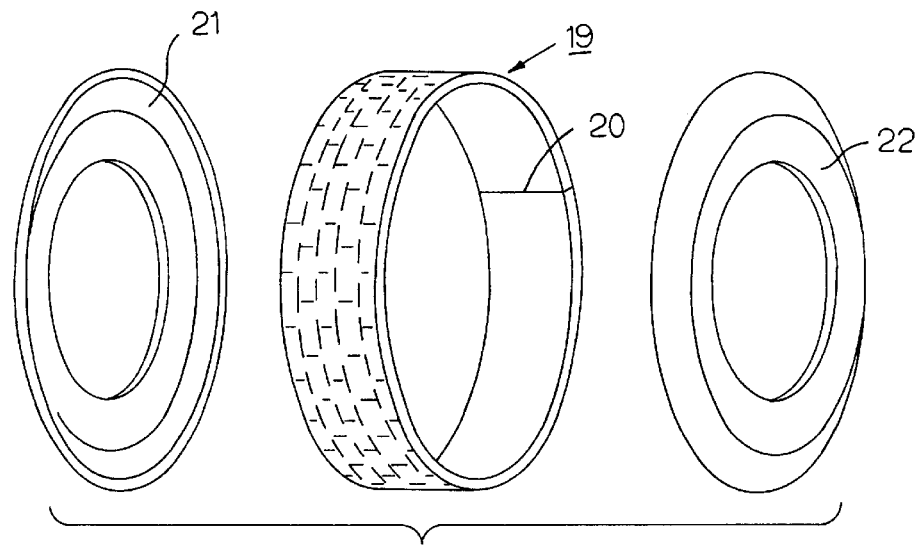
FIG. 1 is a sketch of a known tire carcass cut configuration providing a treaded strip and two sidewalls that are employed in the present invention as storable sections of the tire carcass.

Tire carcasses have been processed in the prior art to obtain flat treaded strips from the annular portion 19 as a raw material by means of cut 20 in FIG. 1, providing the two sidewalls 21, 22 cut from the annular treaded portion 19.

The hereinbefore disclosed prior art is representative of the state of the prior art employment, handling and storage of such strips, which are typically bolted and compressed in stacks retained and confined in metallic cages. Thus the prior all methods of stacking and storing flat tire sections cut from discarded tires are expensive with the requirement of specialty containers, accessory hardware and the corresponding labor required to assemble the strips and install hardware.

Pallets adapted for handling bulk goods with fork lift trucks are also well known in the prior art as illustrated in plan, end and side views of FIGS. 2A, 2B and 2C. The pallets 25 are generally of a standardized width 27, length 26 and height 28, and have on the underside of the platform 24 normal to the length 26 channels 29 and 30 for receiving fork lift truck loading prongs.

The flat sections cut from discarded tire carcasses and pallets adapted for handling and transporting bulk loads with fork lift trucks are raw material elements of the present invention, which provides by addition of novel method steps and corresponding added elements, improved methods and apparatus for low cost bulk storage of rubber from discarded tire carcasses in novel configurations not available in the prior art for handling and transporting with fork lift trucks loads of flat rubber sections cut from discarded tire carcasses in configurations for environmentally safe outdoor storage in outdoor sites in a format that precludes the accumulation of water. Therefore this invention improves the art of bulk storage of discarded tire carcass rubber.

It is shown heretofore from the cited patents that the known prior art of bulk storage of stacks of treaded strips cut from discarded tire carcasses requires specialty confining metallic cages with bolts, nuts and such accessories and are therefore too costly to process in bulk form for compact mass outside storage in tire dump sites.

Figure 3A:
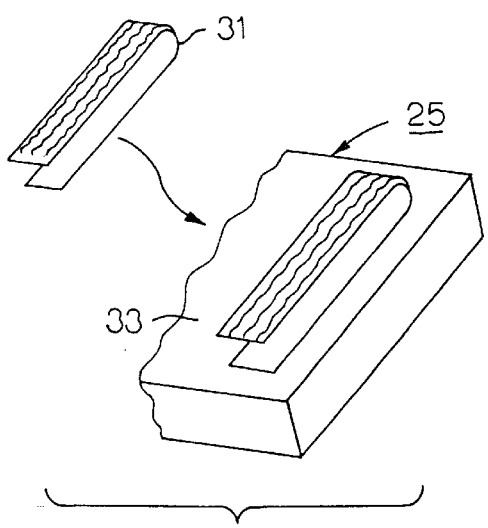
Figure 3B:
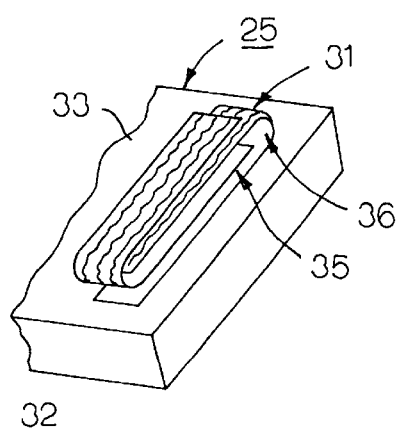

In accordance with this invention it is shown in FIGS. 3 and 3A that the flat treaded strips are folded into U-shaped elements, as shown at 31, and are stacked in a configuration extending substantially edge-to-edge across one length or width dimension of the loading platform 33 of pallets 25 in interlocked rubber-to-rubber frictional contact with adjacent sections (31–32) in the stack. In this embodiment the open end of one strip 35 enters the crotch of an adjacent U-shaped end 36 to place the treaded strips in adjacent rubber-to-rubber contact up to the end of the crotches.

The folded strips 31 of this embodiment, typically six inches in width are stacked approximately five feet high as diagrammatically shown in FIG. 4 in foreshortened format. The treaded strips 31 typically have an overall length approximating ninety-six inches, to be stacked in a series of abutted stacks (FIG. 7) across a pallet 25 having a forty-eight inch edge to edge length dimension in the folded over U-shaped configuration 31 across the length 26 of the pallet 25. The tires are typically loaded to a height of about twenty-five tires. In such cases a loaded pallet would carry several hundred tires stacked in abutted stacks at a height from about fifty to sixty inches to store a bulk load weighing from about 1500 pounds to a ton.

Figure 5:
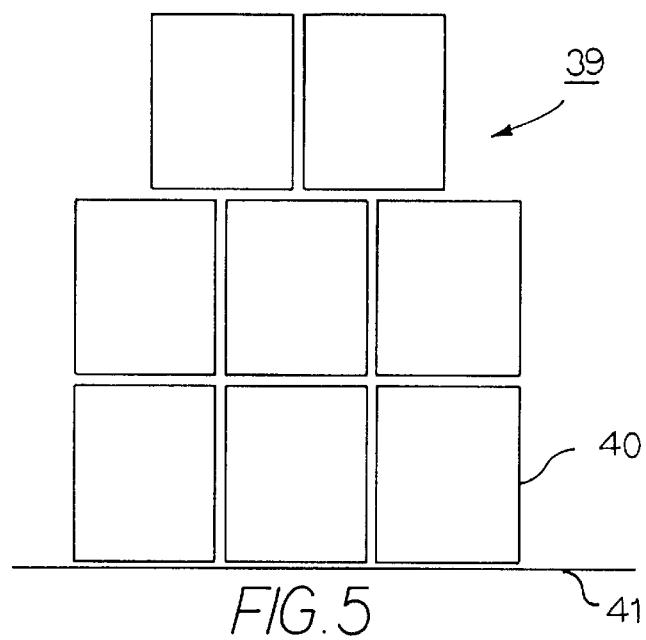
FIG. 5 is a diagrammatic block diagram section view taken across a typical storage configuration of a plurality of pallets at an outdoor site in accordance with the teachings of this invention.

As shown in FIG. 5, the pallets 40 loaded to a height of fifty to sixty inches with processed carcass strips in a stable interlocked configuration that requires no accessory cages, bolts or clamps other than possibly a strap attached to the pallet are ready from handling by fork lift trucks and transportation to an outdoor dump site 41. At the dump site the loaded pallets are stacked one on top of the other generally directly on the ground 41 in a compact configuration such as 39, from which they may be recalled at will for use in processing any suitable type of rubber product.

Figure 6:
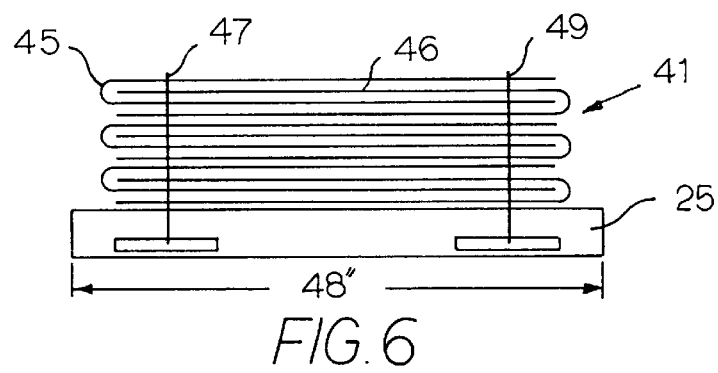
FIGS. 6 and 7 are respectively a partial stack of cut tire carcass treads on a loading platform of a pallet in end view and a top view showing abutted stacks of carcass treads on the pallet platform with bands secured to the pallet near opposite ends of the abutted stacks.
Figure 7:
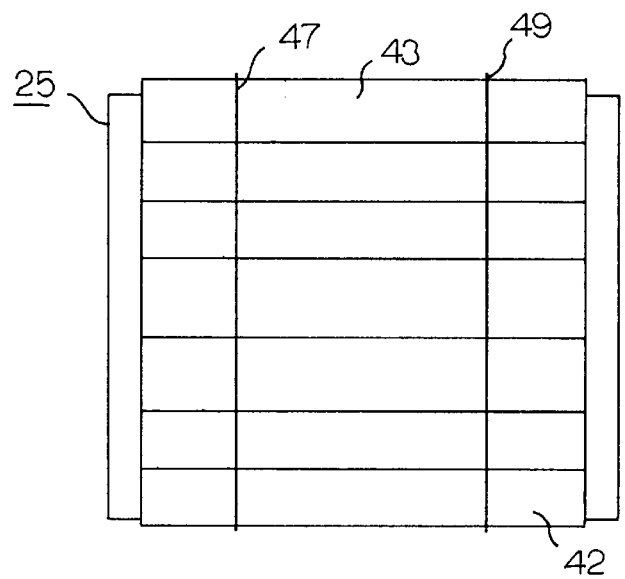

In the respective end and top views of FIGS. 6 and 7, the pallet 25 is shown loaded with abutting stacks 42, 43, etc. of treaded strips arranged in am interlocking cris-crossed configuration with alternating layers of the strips longitudinally directed toward opposite edges across the 48 inch length of the pallet 25. In this embodiment the treaded strips 45 are cut in a length substantially equal to twice the length of the pallet 25 and are folded over to make the U-shaped strip configuration. Adjacent layers tip the stack are interlocked with the strip ends inserted into the U-shaped crotches in this embodiment of the invention. The stacks 42, 43, etc. abutted across the width of pallet 25 are confined by straps 47, 49 affixed to the pallet near each end of the straps to assure that the stacks 42, 43 near the edges of the pallet do not topple during transport.

Figure 8:
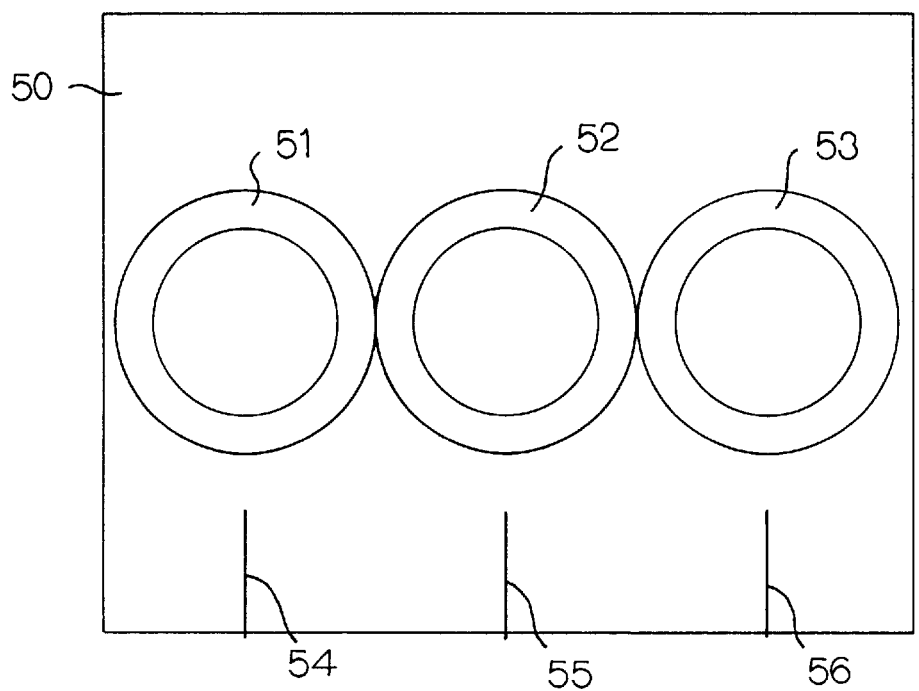
FIG. 8 is a diagrammatic section view looking downwardly at a pallet partially loaded with stacks of sidewall sections cut from tire carcasses.

The plan view of FIG. 8 looks into the pallet loading platform 50 where three sixteen inch annular sidewall stacks 51, 52, 53 are aligned across the forty-eight inch length of the pallet. A parallel second row of stacks could be placed also across the forty-inch width of the pallet. The addition of straps 54, 55, 56 adds stability holding the stacks in place to avoid lateral movement of the stored sidewalls. Larger diameter sidewalls may be arranged with two outer stacks on one side of the pallet and one centered stack on the other side of the pallet.

Figure 9:
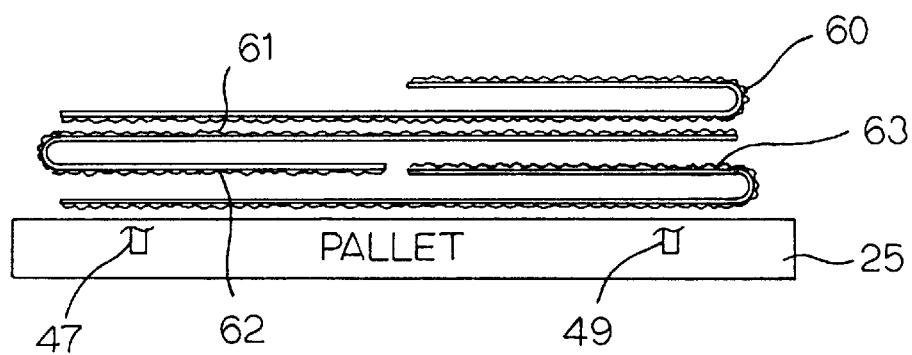
FIG. 9 is an end view sketch of a pallet partially loaded with longitudinal tread strips cut from discarded tire carcasses in an alternate stacking pattern embodiment of the invention.

In the FIG. 9 embodiment, tread strips 60 are cut to a length of seventy-two inches and are folded back twenty-four inches to a length of forty-eight inches to fit lengthwise across the pallet 25 with tread sides shown figuratively at 61, 62 and 63 interlocked with adjacent layers in the stack.

Disclosed features of this invention which are believed to comprise novel advances in the art now set forth in review. The inexpensive method of processing discarded tires for bulk storage in an environmentally safe manner on pallets at outdoor sites without accumulation of water is introduced, where the pallets are transported by fork lift trucks. Such processing involves the simple and inexpensive step of cutting annular rubber portions of reclaimed tire carcasses away from the carcasses to form flat longitudinal treaded strips of the reclaimed rubber. These strips, obtained by cutting away sidewall portions of discarded tire carcasses, are then stacked in several side-by-side abutting multi-layer bulk form batches of about one-hundred strips having a height of five to six feet, typically weighing nearly a ton. Rubber to rubber contact provides frictional impediment to lateral movement of the strips upon the pallet, and thus may be stored securely to withstand transport upon fork lift trucks and stacked upon each other with simple straps near opposite edges of the pallets, thereby avoiding the accompanying prior art hardware necessary for confining stacks such as metallic cages having each stack confined by surrounding bolts or the like. This invention provides stable resistance to lateral movement of strips in the stacks by interlocking rubber strips in rubber-to-rubber pattern configurations upon pallet loading platforms thereby to withstand impacts, and handle shock and travel vibration when maneuvered by a fork lift truck and transported to or from an outdoor bulk storage site.

The flat treaded strips derived from the annular carcass portions are formed in a length and width that are stacked rubber-to-rubber in abutting stable transport batches of a height of substantially live feet in a pattern that substantially covers inexpensive pallet platforms of conventionally specified dimensions. Thus loaded pallets are then removed for compact storage of pallet loads in appropriate compact and stable multiple layer arrays at selected outdoor storage sites without accumulating water.

In one preferred configuration the flat treaded strips have a length compatible with folding aid stacking the treaded strips aligned upon a length or width dimension of said pallets in a U-shaped configuration with two respective strip ends of one treaded strip alternately interlocked between the open ends of adjacent stacked treaded strips thereby to substantially fill the inner end of the U-shaped folded tread strip configuration. The flat treaded strips are arranged upon the pallet platforms with the closed and open ends of a plurality of the U-shaped configurations alternating at opposite ends of the stacked strips.

The treaded strips cut from the discarded tire carcasses in a configuration for stable self-supporting storage upon a pallet loading platform in a rubber-to-rubber interfacing pattern that precludes collection of water may comprise different stacking pattern embodiments for achieving the stable self-supporting rubber-to-rubber interfacing interlocked configuration on the pallet loading platform as introduced by this invention without requiring expensive bolts, clamps and cages. Thus this invention introduces inexpensive hardware configurations with low labor costs by stacking rubber sections cut from discarded tires upon a pallet loading platform adapted for transport by a fork lift.

The stored carcass rubber batches assembled in accordance with this invention in an environmentally safe, low assembly cost apparatus for storing and handling discarded tire carcasses in an outside site without the accumulation of water also provides novel corresponding apparatus for environmentally safe bulk storage of discarded tire carcasses unknown in the prior art. Furthermore this invention advances the stage of the art as well in the outdoor storage dump configuration where the loaded pallets are stored compactly on the pallets for later reclamation.

Having therefore advanced the state of the art with novel methods and apparatus not heretofore known in the art to improve the state of the environment in storage of discarded tire carcasses, those novel features believed representative of the invention are set forth in detail in the following claims.

What is claimed is:

1. Environmentally safe, low assembly cost apparatus for storing and handling rubber tread strips from discarded tire carcasses in a compact configuration for bulk storage on a pallet at an outdoor site in a configuration that precludes accumulation of water for breeding of mosquitos, comprising in combination:

said pallet comprising a loading platform of specified width and length dimensions, and having a configuration for transport by a fork lift truck, and a plurality of reclaimed treaded tire carcass strips cut from an annular portion of the discarded tire carcasses with removed opposing sidewalls, wherein the annular portions are flat treaded longitudinal strips stacked at said outdoor site in several side by side abutting multi-layer stacks of individual said rubber tread strips substantially covering the loading platform in an interlocked self-supporting configuration that retains a multiplicity of treaded strips in said multilayer stacks having rubber-to-rubber pattern configuration providing impediment to lateral movement of the strips on said platform thereby tending to stably retain said stacks in place on said pallet when the stacks are transported upon said pallet by a fork lift truck, said strips being of similar length and width stacked in said rubber-to-rubber contact pattern disposed longitudinally upon said platform along one of the specified dimensions, wherein said rubber-to-rubber pattern further constitutes configuration means in said stacks that precludes said accumulation of water.

2. The apparatus defined in claim 1 further comprising an accumulation of a multiplicity of loaded pallets at one said storage site stacked one on top of the other in a compactly stored configuration of pallets loaded with said flat treaded strips at said outdoor storage site.

3. The apparatus defined in claim 1 further comprising a configuration of a plurality of the flat treaded strips having a length compatible with folding and stacking the treaded strips aligned upon a length or width dimension of said pallet loading platform in a U-shaped configuration with two respective strip ends of one treaded strip alternately interlocked between two ends of a adjacent stacked treaded strips stacked upon the pallet substantially filling the closed end of the U-shaped configurations with the closed ends alternating at opposite ends of the stacked strips.

4. The apparatus of claim 1 further comprising flat treaded strips of a length greater than one of the loading platform dimensions stacked in a folded U-shaped configuration interlocking one end of a further treaded strip on the stack.

5. The environmentally safe low cost bulk storage configuration of reclaimed flat rubber tread strips with sidewall portions removed which are cut from a plurality of discarded tire carcasses and stored in said bulk storage configuration on a pallet loading platform at an outside storage site in a format precluding accumulation of water in which mosquitos breed comprising in combination:

a plurality of flat treaded strips without sidewalls cut from annular strips of the carcasses, with said flat treaded strips stacked in a plurality of side-by-side abutting multi-layer stacks upon said pallet loading platform, means for providing frictional impediment to lateral movement of the strips upon the pallet comprising stable stacks of treaded strips stacked in a rubber-to-rubber configuration precluding bolts and cages, which rubber-to-rubber configuration in the stacks further constitutes means for precluding accumulation of water in which mosquitos are bred, and said abutting stacks further constituting means for stably riding upon loading platforms of pallets without lateral movement of the tire tread strips when transported by fork lift trucks both to and from said storage site.

6. The environmentally safe low cost configuration of reclaimed flat rubber tread strips with sidewall portions removed from a plurality of discarded tire carcasses and stored at an outside storage site in a format precluding accumulation of water comprising in combination:

a plurality of said flat treaded strips without sidewalls cut from annular strips of the carcasses with laterally movable flat treaded strips stacked in several side-by-side abutting multi-layer bulk form stacks upon a pallet loading platform transportable by fork lift trucks, means for providing frictional impediment to lateral movement of the strips upon the pallet loading platform as stable bodies in which the strips are in a rubber-to-rubber configuration precluding bolts and cages, which bodies constitute means for precluding accumulation of water, and said bodies further constituting means for stably riding upon loaded platforms of the pallets without lateral movement of the strips, wherein said configuration stored at the outside storage site further comprises a compact arrangement stacking one loaded pallet platform on top of another at said outdoor storage site.

* * * * *